(12) United States Patent
Lee et al.

(10) Patent No.: US 8,156,341 B2
(45) Date of Patent: Apr. 10, 2012

(54) PATTERN RECOGNITION METHOD AND APPARATUS FOR DATA PROTECTION

(75) Inventors: Yongjin Lee, Gyeonggi-Do (KR); Ki Young Moon, Daejeon (KR); Yun Su Chung, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 768 days.

(21) Appl. No.: 12/234,263

(22) Filed: Sep. 19, 2008

(65) Prior Publication Data

US 2009/0080778 A1    Mar. 26, 2009

(30) Foreign Application Priority Data

Sep. 21, 2007    (KR) .................. 10-2007-0096934

(51) Int. Cl.
*H04L 9/32* (2006.01)
(52) U.S. Cl. ...................... 713/179; 713/186
(58) Field of Classification Search .............. 713/179, 713/155
See application file for complete search history.

(56) References Cited

U.S. PATENT DOCUMENTS

| | | | | |
|---|---|---|---|---|
| 6,311,272 B1* | 10/2001 | Gressel | ............... | 713/186 |
| 7,840,034 B2* | 11/2010 | Takahashi et al. | ............ | 382/116 |
| 7,844,827 B1* | 11/2010 | Itoi | ............... | 713/186 |
| 7,916,901 B2* | 3/2011 | Hillhouse | ............ | 382/115 |
| 2006/0123241 A1* | 6/2006 | Martinian et al. | ............ | 713/186 |

FOREIGN PATENT DOCUMENTS

| | | |
|---|---|---|
| KR | 1020020065249 | 8/2002 |
| KR | 1020030071878 | 9/2003 |
| KR | 1020040000477 | 1/2004 |
| WO | WO-00/51244 A1 | 8/2000 |

OTHER PUBLICATIONS

"Implementation of Automatic Fuzzy Fingerprint Vault", by Ki Young Moon et al., Proceedings of the Seventh International Conference on Machine Learning and Cybernetics, Kunkimg, pp. 12-13 Jul. 2008.*

(Continued)

*Primary Examiner* — Jung Kim
*Assistant Examiner* — Thomas Ho
(74) *Attorney, Agent, or Firm* — Nelson Mullins Riley & Scarborough LLP; EuiHoon Lee, Esq.

(57) ABSTRACT

Provided a secure pattern recognition method. The method includes: receiving data and generating a probe by converting the received data into a template for pattern recognition; accessing a gallery that is a template registered and stored in advance; determining a region to which the probe belongs and obtaining the center point of the region; obtaining a hash value of the center point and coordinate of the probe; and determining whether or not the hash value of the center point and a hash value stored in the gallery are equal and determining whether or not the probe and the gallery are classified into the same class by calculating whether or not the coordinate of the probe is inside a decision boundary configured with thresholds on the basis of the coordinates of the center point.

47 Claims, 13 Drawing Sheets

OTHER PUBLICATIONS

"Automatic Alignment of Fingerprint Features for Fuzzy Fingerprint Vault", by Chung et al., Conference on Information Security and Technology 2005, LNCS 3822, pp. 358-369.*

Korean Office Action for Application No. 10-2007-0096934, dated Apr. 28, 2009.

Kang, Jeonil et al., "Two Factor Face Authentication Scheme with Cancelable Feature," *IWBRS 2005, LNCS 3781*, S.Z. Li, Ed., Springer-Verlag, Berlin, pp. 67-76 (2005).

Teoh, Andrew B.J. et al., "An Integrated Dual Factor Authenticator Based on the Face Data and Tokenised Random Number," *ICBA 2004, LNCS 3072*, D. Zhang Ed., Springer-Verlag, Berlin, pp. 117-123 (2004).

Korean Office Action for Application No. 9-5-2009-043418454, dated Oct. 22, 2009.

* cited by examiner

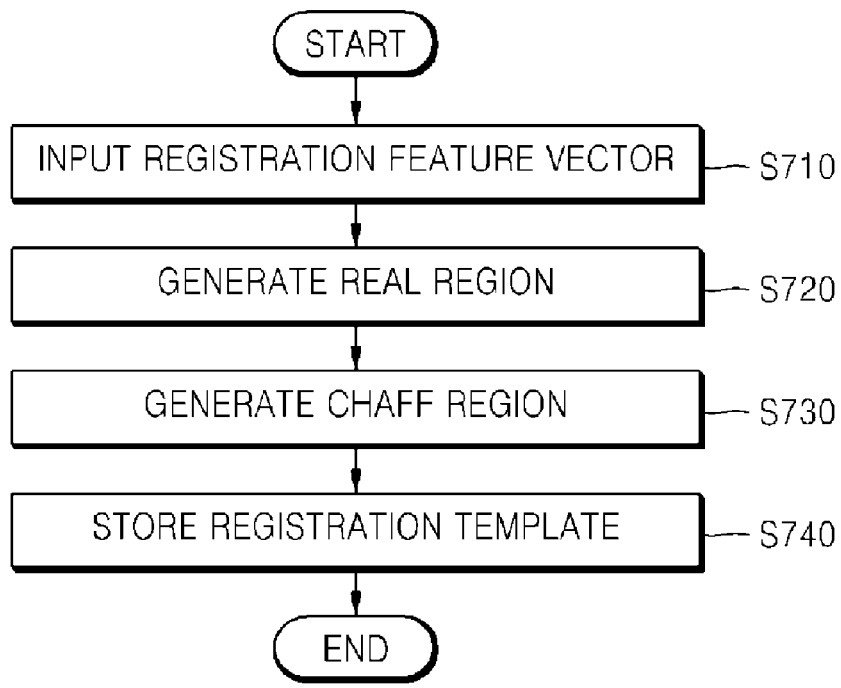

0
x : $(C_{x1}, T_{x1}), (C_{x2}, T_{x2}), (R_x, S_x), (C_{x3}, T_{x3}), (C_{x4}, T_{x4})$
y : $(C_{y1}, T_{y1}), (C_{y2}, T_{y2}), (R_y, S_y), (C_{y3}, T_{y3}), (C_{y4}, T_{y4})$ $\theta$ 1: $(C_{11}, T_{11}), (C_{12}, T_{12}), \ldots, (R_1, S_1), \ldots, (C_{1m}, T_{1m})$
2: $(C_{21}, T_{21}), (C_{22}, T_{22}), \ldots, (R_2, S_2), \ldots, (C_{2m}, T_{2m})$
3: $(C_{31}, T_{31}), (C_{32}, T_{32}), \ldots, (R_3, S_3), \ldots, (C_{3m}, T_{3m})$ $\ldots$ n: $(C_{n1}, T_{n1}), (C_{n2}, T_{n2}), \ldots, (R_n, S_n), \ldots, (C_{nm}, T_{nm})$ RELATIVE COORDINATES OF DECISION BOUNDARY, $H(R_x, R_y)$ $x : C_{x1}, C_{x2}, R_x, C_{x3}, C_{x4}$ $y : C_{y1}, C_{y2}, R_y, C_{y3}, C_{y4}$

PATTERN RECOGNITION METHOD AND APPARATUS FOR DATA PROTECTION

CROSS-REFERENCE TO RELATED PATENT APPLICATION

This application claims the benefit of Korean Patent Application No. 10-2007-0096934, filed on Sep. 21, 2007, in the Korean Intellectual Property Office, the disclosure of which is incorporated herein in its entirety by reference.

BACKGROUND OF THE INVENTION

1. Field of the Invention

The present invention relates to a secure data storage and management method in consideration of data variability. The present invention also relates to a pattern recognition and data protection technique that converts data into a secure form so that the original data, which are used for registration, cannot be recovered or revealed when a system or database is hacked or compromised. In addition, the present invention relates to a pattern recognition and data protection method, where comparison between newly inputted data and registered data, or recognition newly inputted data with registered data, is performed in a transformed state in order to protect the original data which are used for registration.

Moreover, the present invention relates to a method of converting biometric information on a user into a secure form to protect the biometric information and privacy of the user and a method of recognizing/authenticating the user by using the converted biometric information so that original biometric information on the user cannot be exposed. In addition, the present invention relates to a data encryption and decryption technique for securely storing and releasing secret information by using biometric data that are unique to a person and can be used for user identification and authentication, but are changed for every acquisition even though acquired from the same person.

This work is supported by the IT R&D program of MIC/IITA [2007-S-020-01, Development of Privacy Enhanced Biometric System].

2. Description of the Related Art

Pattern recognition is applied in various fields in the modern society. General applications of the pattern recognition include user computer interface techniques such as voice recognition and face recognition, handwriting recognition techniques, automatic spam filtering techniques, web searching techniques, biometrics for user identification authentication, and the like.

In addition, as requirements for automatic analysis of massive data have increased, pattern recognition applications have extended to data mining techniques such as personal consumption pattern analysis for customized advertisement and automatic health check-up using a user's medical information.

In pattern recognition applications, generally, a template or a model that represents feature data or a data group is created and stored in a system. In addition, the system compares newly input data with the registered template and determines how similar the newly input data and the registered data are or whether or not the newly input data and the registered data are classified into the same class.

For example, it is assumed that a handwriting recognition system for recognizing and identifying the letter 'A' is provided. The system receives the letter 'A' via a user's input in advance, extracts unique features of the letter 'A', and generates and stores a template or a model for the letter 'A'. Thereafter, when a user inputs an arbitrary letter, the system compares the arbitrary letter with the stored template or the model for the letter 'A' and calculates a similarity or a dissimilarity therebetween. Then, it is determined whether the similarity or the dissimilarity is larger or smaller than a predetermined value, that is, a threshold to determine whether or not the letter newly input by the user is the letter 'A'.

In a case where the similarity is used as a comparison value, if the similarity is larger than the threshold, the letter input by the user is classified as the letter 'A', and if the similarity is smaller than the threshold, the input letter is classified as another letter excluding the letter 'A'. In a case where the dissimilarity is used as the comparison value and Euclidean distances are used for determining the dissimilarity, if the comparison value is smaller than a threshold, the input word is classified as the letter 'A', and if the comparison value is larger than the threshold, the input word is classified as another letter excluding the letter 'A'.

In summary, in the aforementioned method, a template or a model, which is regarded to belong to the same class as input data, or an input entity is designated, and the input data is compared with the designated template through one-to-one matching to determine whether or not the input data belongs to the same class as the template or the model.

Pattern recognition is also used for web-searching, i.e., a recognition technique through one-to-many comparison.

In the web-searching technique, information on many homepages is collected, and information on each homepage is summarized, and the summarized information is registered as a template or a model of a corresponding homepage in a database. When a web-searching user inputs a keyword, the web-searching system compares the keyword input by the user with templates or models for the registered homepages and displays a list of templates and models in order of similarity for the user.

In most of the pattern recognition application systems, irrespective of the one-to-one matching and the one-to-many matching approaches, input data is compared with a registered template as described above, and similarity or dissimilarity is calculated by using a comparison value. Specifically, even if pieces of data used in the pattern recognition techniques are acquired from the same person, the same entity, or the same device, the pieces of data do not show the same value but show slightly different values from each other for every data input and acquisition. Therefore, a comparison method of whether two pieces of data have exactly the same value cannot be used to determine whether or not the two pieces of data belong to the same class.

For example, in the handwriting recognition technique described above, even the same user cannot identically write the letter 'A' several times. For another example, when a fingerprint is recognized, data on the fingerprint becomes different according to a direction or a pressure of the fingerprint.

When the template or the model registered in the system using the pattern recognition techniques is leaked and abused, serious social and economical problems may occur. For example, it is assumed that a list of purchased goods of a consumer is stored in a database to obtain a consumption pattern of the consumer or for personalized advertisement. The stored data is related to a private consumption pattern of the user. Therefore, when the data is leaked, the consumer's privacy can be intruded. In addition, personal medical information stored for automatic health check-up is more privacy sensitive than the data related to the aforementioned consumption pattern.

A field to which general users may have easier access is the biometrics. A biometric system is a system for identifying a person by using physical/behavioral feature data about the person. Similarly to the general pattern recognition system which generates the template as described above, the biometric system generates and uses a template having physical/behavioral features and information on a user for user registration and identification.

The template registered and stored in the recognition system is referred to as a gallery, and a template that is newly generated from a user who requests authentication is referred to as a probe. When the user requests identification, the biometric system accesses and compares the gallery with the probe and classifies the user as a genuine or an impostor by using a result value of the comparison.

Since the biometric data has unique information on users, similarly to the aforementioned example, intrusion of privacy can occur if such data is disclosed or leaked.

Particularly, the biometric data is used as a kind of password for security. Therefore, in a case where a research institute or business uses a security apparatus using the biometric system, if the biometric information is leaked, in addition to the intrusion of privacy, the security of the research or business is threatened. In addition, the number of pieces of data used for user authentication is limited unlike the case of a general password, for example, a human has only one face and ten fingerprints. Thus, the loss or compromise of a user's biometric data can result in the permanent loss. The leakage of biometric data is more serious than that of other pattern recognition data.

Therefore, for data that is important or privacy sensitive such as biometric information, a method of encrypting and storing data so as that original information cannot be exposed has been suggested.

However, difficulties arise since it is impossible to obtain the same value from most of the pattern recognition data including the biometric data as described above while due to characteristics of a cryptographic function, very similar values are encrypted to completely different values.

Therefore, when data that is newly input is encrypted and compared with the data that is encrypted and registered in advance, a comparison value that is generated as a result of the comparison is not consistent with a comparison value obtained by comparing the input data that is not encrypted with original data. Therefore, instead of directly using the encrypted data for pattern recognition, the encrypted data has to be decrypted for comparison and recognition.

A method of protecting a registered template with encryption has a disadvantage in that the encrypted template has to be decrypted whenever data comparison is performed, and this results in security vulnerability.

As another method of protecting sensitive data such as a password, a method using a hash function has been proposed. In this method, in an authentication system generally using a password, the password of a user is not directly compared for authentication, but a hashed password is stored in advance, and the hashed password is compared with a hashed password input for authentication.

However, while it is possible for a user inputs the same password every time, the same value cannot be generated from pieces of data used for pattern recognition such as the biometric information even though the pieces of data are input from the same person, the same entity, or the same device, but quite different result values are generated from similar input values through the hash function. Therefore, pattern recognition using hashed templates is not accurate.

Difficulties of the existing encryption technique to protect the pattern recognition data due to data variability are associated with biometric-based key management combining the general encryption system and the biometric system.

In a general encryption-based user authentication and security system, the user is authenticated or data is encrypted by using a password or a private key of the user. It is well known that a long password or a long private key that is randomly generated has to be used to obtain high security. However, it is very difficult for the user to always remember the long password accurately.

In order to solve the aforementioned problem, by using a short and simple password that the user can easily remember, an original long and complex password or a private key is encrypted, and as needed, the original long and complex password or the private key is decoded to be used for a general encryption operation. However, since the security of the long and complex password depends on the short and simple password, the overall security is equivalent to using just a short and simple password.

As another method, an original long and complex password or a private key is stored in a personal storage device such as a smartcard, and the password is released to be used as needed. However, the smartcard can be lost.

Due to practical limitations of remembering and managing the long password or the private key for the user, a conventional authentication and encryption system is dependent on an apparatus having a low security level, and thus, the security level of the entire system decreases.

However, instead of using a password that the user may forget or a smartcard that can be lost, in order to effectively solve the user key management problem that occurs in the aforementioned existing encryption and security systems, biometric information may be used to manage and protect the password or the private key.

As a method of applying biometrics to the user key management of the existing encryption system, a biometric-based key release method has been proposed. The biometric-based key release method uses biometric information on the user to authenticate the user. In addition, according to a result of the authentication, when the user is identified as a genuine, security information such as a password or a private key of a corresponding user is released from a smartcard, a system, or a database.

The aforementioned method has an advantage in that the biometric method and the encryption system can be easily combined and implemented. However, since biometric information registered for user authentication and the security information such as the password or the private key are separated from each other to be stored in the system, a security problem may still occur. A hacker may directly steal only the password or the private key used for the encryption operation without attacking the biometric system and may exploit the password or the private key. Therefore, basically, the biometric-based key release method cannot protect the security information such as the password or the private key securely. In addition, similar to the existing biometric system, there is a problem in that the biometric information on users registered in the system can be exposed.

Therefore, as an ideal method, the long and complex password or the private key used for the general encryption operation is encrypted and stored by using the biometric information on the user as a cryptographic key. In addition, as needed, the password or the private key is decoded by using the biometric information on the user, and the decoded long and complex password or the personal key is used for the general encryption operation such as encryption/decryption.

However, although the biometric information is acquired from the same user or the same device, values of the acquired data are not fixed but different from each other every time. The hash function and the encryption/decryption techniques used in the existing encryption-based security system generate completely different output values from similar input values. Therefore, as described above, directly using the biometric information as the key in the existing encryption method is not good.

SUMMARY OF THE INVENTION

The present invention provides a secure data storage and management method in consideration of data variability.

Specifically, the present invention provides a data protection technique of converting original data into a secure form so that information on the original data cannot be extracted or recovered from registered data when a system or a database is hacked or compromised.

The present invention also provides a pattern recognition method of comparing/recognizing newly input data with registered data without revealing the original data, which are used for regisgration, for secure data management.

The present invention also provides a data encryption and decryption method of securely storing and releasing secret information by using a variable value.

The present invention also provides a pattern recognition apparatus for converting original data into a secure form so that information on the original data cannot be extracted from the registered data when a system or a database is hacked or compromised, and comparing/recognizing newly input data with registered data without restoring the original data, which are used for registration, for secure data management.

According to an aspect of the present invention, there is provided a secure pattern recognition method including: (a) receiving data and generating a probe by converting the data into a template for pattern recognition; (b) accessing a gallery that is a template registered and stored in advance; (c) determining a region to which the probe belongs and obtaining a region associated value from the region; and (d) determining whether or not the probe and the gallery are classified into the same class by comparing the probe and the gallery using the region associated value.

According to another aspect of the present invention, there is provided a template generation method for secure pattern recognition, including: (a) inputting a registration feature vector; (b) generating a real region using the registration feature vector; (c) generating a predetermined number of chaff regions at regions excluding the real region; and (d) storing a registration template including information on the real region and the chaff regions.

According to another aspect of the present invention, there is provided a secure pattern recognition apparatus including: an information receiver receiving data; a template generator generating a template from the data received to the information receiver; a template processor determining a region of the template generated by the template generator, obtaining a value associated with the region, and calculating a hash value of the associated value and coordinates of the template; a template storage storing a gallery generated in advance; and a comparison determiner calling the gallery from the template storage and comparing and determining whether or not the template is genuine according to a result of processing of the template processor.

BRIEF DESCRIPTION OF THE DRAWINGS

The above and other features and advantages of the present invention will become more apparent by describing in detail exemplary embodiments thereof with reference to the attached drawings in which:

FIG. 7 is a flowchart of a secure data structure generation and conversion method according an embodiment of to the present invention;

FIG. 8 is a general example of a data structure according to an embodiment of the present invention;

DETAILED DESCRIPTION OF THE INVENTION

Hereinafter, a secure pattern recognition method and apparatus according to the present invention will be described in detail with reference to the attached drawings. In the description, the detailed descriptions of well-known technologies and structures may be omitted so as not to hinder the understanding of the present invention. In addition, terms in the present invention are defined in consideration of functions according to the present invention and may be changed according to an intention of a user or an operator or a usage. Therefore, definitions of the terms should be construed based on the description of the specification.

It should be noted that terms from biometric technology are used for the convenience of description, because the technical concepts and terms from biometric technology among pattern recognition applications are well defined. The present invention is not limited to the field of biometrics, and the principle of the present invention is described by using terms from biometric technology so that the principle of the present invention can be easily applied to other fields through examples of the description.

For the convenience of description, a template registered and stored in a pattern recognition system is referred to as a gallery, and a template generated from data that is newly input to be recognized is referred to as a probe.

Figure 1:
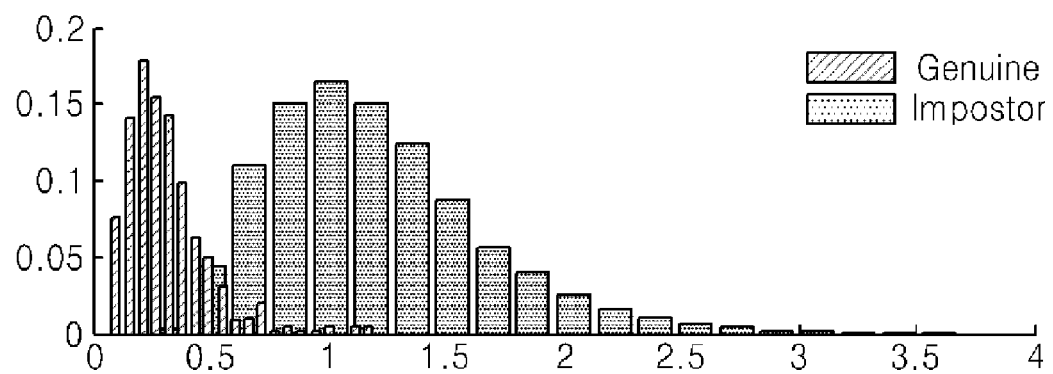
FIG. 1 is a graph illustrating an example of a genuine comparison values distribution and an impostor comparison values distribution in pattern recognition.

FIG. 1 is a graph illustrating an example of a genuine comparison values distribution and an impostor comparison values distribution in pattern recognition.

The genuine comparison values distribution is a comparison values distribution generated by comparing galleries and probes that belong to the same class, and the impostor comparison values distribution is a comparison values distribution generated by comparing galleries and probes that belong to different classes from each other.

In biometrics, FIG. 1 illustrates an example of the genuine comparison values distribution and the impostor comparison values distribution. A Euclidean distance is used as the comparison value, so that most of the genuine comparison values are smaller than the impostor comparison values.

There is a point at which a distribution of the genuines and a distribution of the impostors are equal, and a distribution value at this point is referred to as an equal error rate (EER). At this point, a false rejection rate (FRR), which is a rate of classifying a gallery and a probe that belong to the same class into different classes, and a false acceptance rate (FAR), which is a rate of classifying a gallery and a probe that belong to different classes into the same class, are equal.

In biometrics, at this point, a rate at which a genuine user is classified as an impostor and authentication fails and a rate at which an impostor is classified as a genuine user are equal. In general, this point is referred to as a threshold $\theta$, and when a comparison value between a gallery and a probe is smaller than the threshold $\theta$, the gallery and the probe are classified into the same class (the probe is referred to as genuine), and when the comparison value is larger than the threshold $\theta$, the gallery and the probe are classified into different classes (the probe is referred to as an impostor). This is explained by the same principle in that the probe is determined as genuine when the comparison value is smaller than the threshold $\theta$ and determined as the impostor when the comparison value is larger than the threshold $\theta$ in biometrics. It is not necessary to set the value of the threshold $\theta$ based on EER and it can be adjusted in order to properly control the FRR and the FAR according to a system application.

The threshold $\theta$ for classifying the genuine and the impostor has a meaning of a decision boundary in a feature space. The decision boundary is described in detail with reference to FIG. 2.

Figure 2:
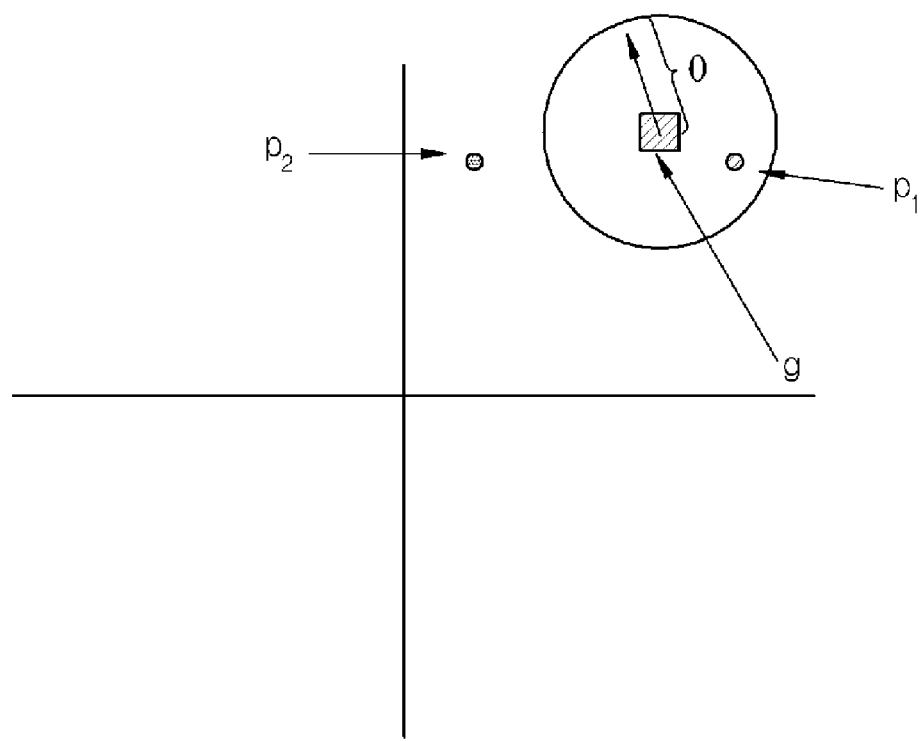
FIG. 2 is a diagram for explaining a relationship between a threshold and a decision boundary in a feature space.

FIG. 2 is a diagram for explaining a relationship between the threshold and the decision boundary in the feature space. In FIG. 2, g denotes a gallery, and $p_1$ and $p_2$ denote probes.

It is assumed that the threshold for determining the genuine and the impostor is set to $\theta$, and a template for recognition is a two-dimensional real-valued vector. In this case, as illustrated in FIG. 2, a circle, which has a radius $\theta$ and the center at a registered template, that is, the gallery g, is the decision boundary. Specifically, in a case where recognition is requested, if the comparison value between the probe and the gallery is smaller than $\theta$, the probe is classified into the same class (that is, the probe is genuine) as the gallery, and if the comparison value is larger than $\theta$, the probe is classified into a different class (that is, the probe is an impostor) from the gallery. This also can be explained by the same principle in that a probe inside the circle having the center at the gallery g and the radius $\theta$ is classified into the same class (the probe is referred to as genuine) as the corresponding gallery g and a probe outside the circle having the radius $\theta$ is classified into a different class (the probe is referred to as an impostor).

Since the probe $p_1$ is inside the circle having the radius $\theta$ and the center at the gallery g, the probe $p_1$ is classified into the same class (the probe is referred to as genuine) as the gallery, and a comparison value between the probe $p_1$ and the gallery g is smaller than the threshold $\theta$. In addition, since the probe $P_2$ is outside the circle having the radius $\theta$ and the center g, the probe is classified into a different class (impostor) from the gallery, and a comparison value between the probe $P_2$ and the gallery g is larger than the $\theta$. For the convenience of description, two-dimensional data is exemplified. In a three-dimensional space, a decision boundary is a sphere having a radius $\theta$, and in a high-dimensional (more than three) space, the sample principle is applied.

For a better understanding, a 'decision equivalence principle' is described with reference to FIGS. 3 and 4.

Figure 3:
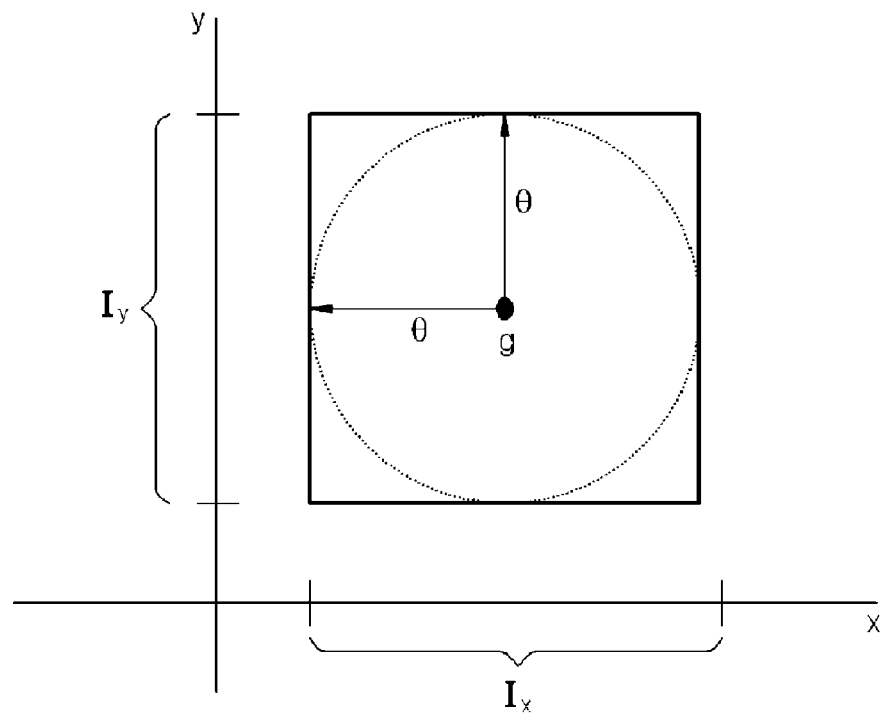
FIG. 3 is a diagram for explaining a decision equivalence principle.
Figure 4:
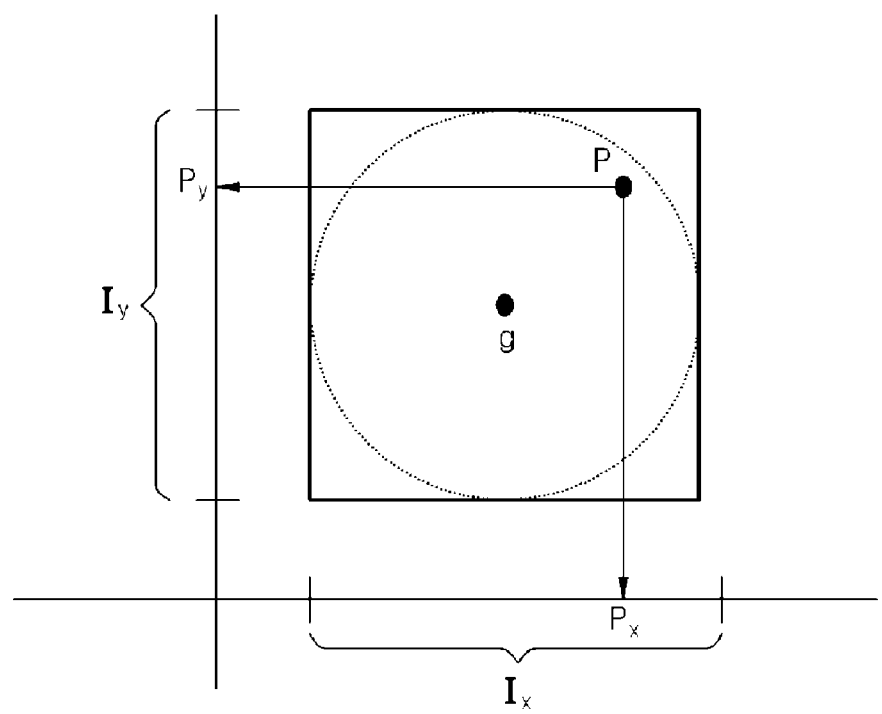
FIG. 4 is a diagram for explaining the decision equivalence principle.

FIG. 3 illustrates a square which circumscribes a decision boundary circle having the radius $\theta$ and the center at the gallery g, and a horizontal axis (x-axis) region $I_x$ and a vertical axis (y-axis) region $I_y$ of the square. Therefore, the horizontal and vertical lengths of the square are $2\theta$, and the lengths of the regions $I_x$ and $I_y$ are $2\theta$, too. As illustrated in FIG. 4, if a feature vector p is inside the square having the center at the gallery g, an x-component $p_x$ and a y-component $p_y$ of the feature vector p are inside the regions $I_x$ and $I_y$, respectively. Inversely, if the x-component $p_x$ and the y-component $p_y$ of the feature vector p are inside the regions $I_x$ and $I_y$, respectively, the feature vector p is inside the square that circumscribes the decision boundary circle having the radius θ and the center g.

Similarly, if the feature vector p is inside the circle having the radius θ and the center g, the x-component $p_x$ and the y-component $p_y$ of the feature vector p are inside the regions $I_x$ and $I_y$, respectively, and distances between the feature vector p and the coordinate that consists of the center points of the regions $I_x$ and $I_y$ is smaller than θ. Inversely, if the x-component $p_x$ and the y-component $p_y$ of the feature vector p are inside the regions $I_x$ and $I_y$, respectively, and the distances between the feature vector p and the coordinate that consists of the center points of the regions $I_x$ and $I_y$ is smaller than θ, the feature vector p is inside the decision boundary circle having the radius θ and the center g.

The 'decision equivalence principle' is described to show that decision results of an existing pattern recognition genuine/impostor decision method based on the threshold θ are equivalent to decision results of the comparison/recognition method of deciding whether or not each component of a probe feature vector belongs to a region of each axis derived from a gallery feature vector.

Figure 5:
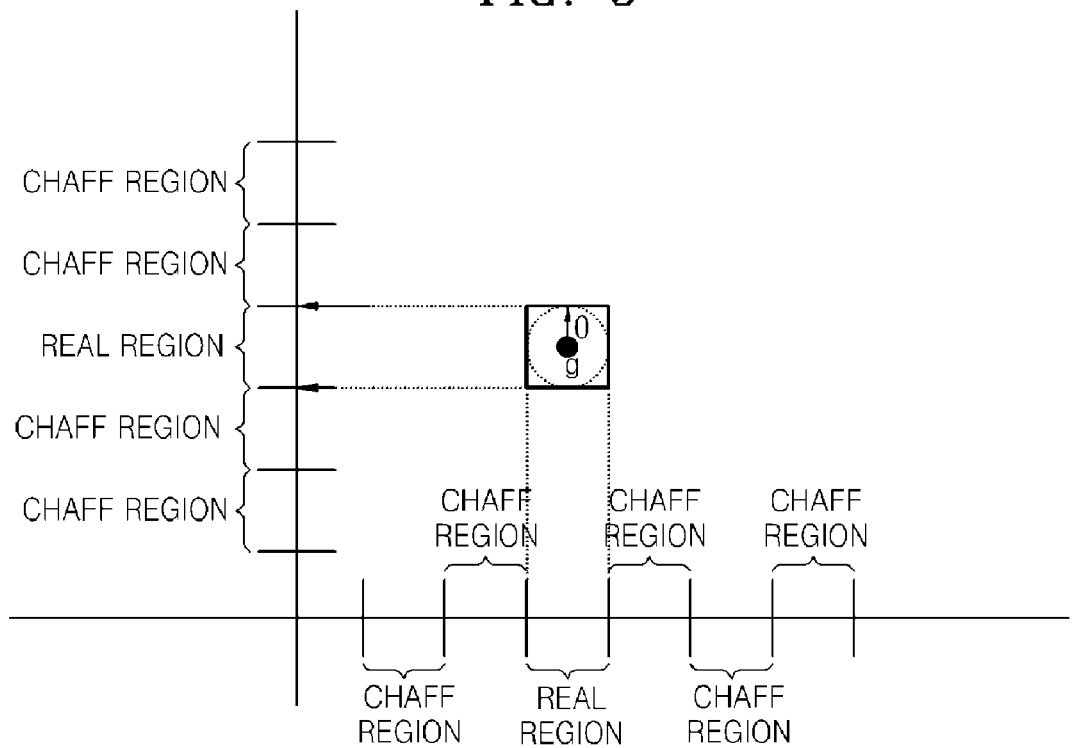
FIG. 5 is a diagram for explaining definitions of a real region and chaff regions according to an embodiment of the present invention.

In order to precisely explain the principle according to the present invention, a 'real region' and 'chaff regions' are defined with reference to FIG. 5.

FIG. 5 illustrates a square that circumscribes the decision boundary circle having the radius θ and the center at the gallery g. Sections corresponding to horizontal and vertical sides of the square are represented as the real region with respect to the axes, and the remaining sections are represented as the chaff regions.

Figure 6:
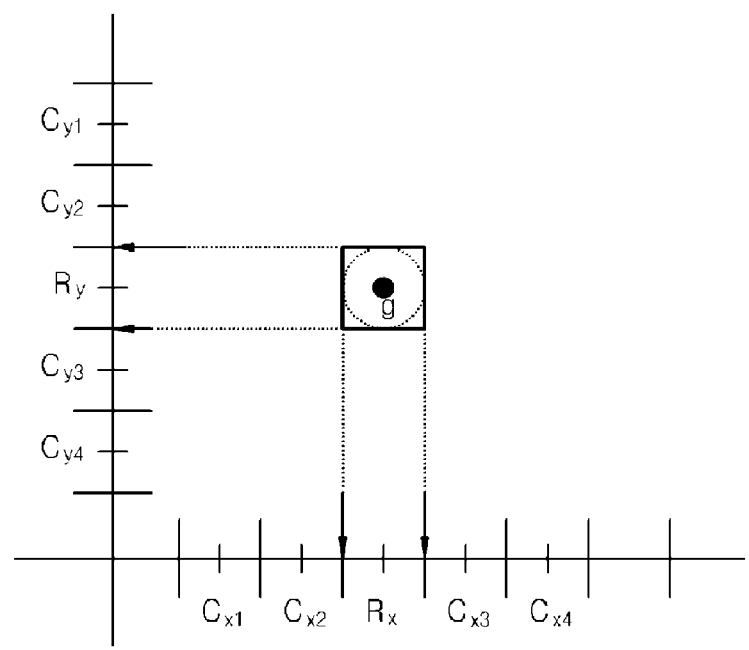
FIG. 6 is a diagram for explaining the center points of the real region and the chaff regions according to an embodiment of the present invention.

FIG. 6 illustrates the center points of the real region and the chaff regions determined in FIG. 5. The center point of the real region is represented as $R(R_x, R_y)$, and the center points of the chaff region are represented as $C(C_{x1}, C_{y1})$, and the like. For the convenience of description, 'the center point of the real region' is used in the current embodiment of the present invention. However, the present invention is not limited to the center point of the real region. However, it should be noted that the center point of the real region may be replaced by a 'region-associated value' through the specification.

More specifically, the center point of the real region used for comparison may be replaced in various manners. For example, when the real region has a shape of a polygon, a vertex may be selected.

In addition, the region associated value may be a value set by a user so as to correspond to the real region. The region associated value may be one of secret information, a password, a private key, or an arbitrary value designated by the user or a hash value of the secret information such as the center point and the vertex, the password, the private key, or the arbitrary value.

When the principle according to the present invention is applied to an existing pattern recognition system in order to securely store pattern recognition data, the length of the real region and the chaff regions may be twice the threshold θ calculated by an analysis of the genuine comparison values distribution and the impostor comparison values distribution of the existing recognition system, in order to maintain the equivalence to that of the genuine/impostor decision results of the existing recognition system. However, the threshold θ is not limited to a particular value, and the lengths of the regions do not need to be equal.

FIG. 7 is a flowchart of a secure data structure generation and conversion method according to the present invention. More specifically, a flowchart of a secure template generation method using definitions of the 'decision equivalence principle', 'real region', and the 'chaff region' described above is illustrated.

In operation S710, a registration feature vector is registered in a pattern recognition system. The registration feature vector has a feature (referred to as template) extracted by using an existing pattern recognition method or a biometric method (such as a face or a fingerprint image).

In operation S720, a real region is generated by using the registration feature vector. The real region is described above with reference to FIGS. 5 and 6.

In operation S730, the chaff regions excluding the real region are generated. Here, the number of the chaff regions may be determined by the user or a system manager. As the number of the chaff regions is increased, the number of computations for obtaining original data from converted data is significantly increased. The chaff regions may have a symmetric structure in which the same number of chaff regions are arranged on both sides of the real region. On the contrary, the chaff regions may have an asymmetric structure in which different numbers of chaff regions are arranged on the both sides of the real region. Preferably, the numbers of the chaff regions allocated to the both sides of the real region may be set to random values for original data protection.

In addition, the numbers of the chaff regions allocated to dimensional axes of the template do not need to be the same. For example, when the template is three-dimensional, the number of chaff regions along the x-axis can be 7, the number of chaff regions along the y-axis can be 10, and the number of chaff regions along the z-axis can be 5. Of course, the same number of chaff regions may be allocated to each axis according to an embodiment of the present invention.

Here, as the region associated value, in addition to a value directly associated with the template, secret information to be hidden may be used. The real region is connected to the secret information to be hidden securely. The secret information may be a password in a password-based user authentication and security system.

According to another embodiment, the secret information may be a private key or an arbitrary value designated by the user. According to another embodiment, the secret information may be a hash value of the password, the private key, or the arbitrary value designated by the user.

According to another embodiment, the secret information may be stored as a value obtained by adding an arbitrary value to the hash value.

On the contrary, a random value is connected to the chaff region. According to another embodiment, a value obtained by adding an arbitrary value to the random value may be stored to be connected to the chaff region.

Last, in operation S740, the registration template including information on the real region, a hash value of the center coordinates, and the chaff region are stored, thereby completing template generation for secure pattern recognition.

A secure template used for the comparison may have a form as follows.

θ, $H(R_x, R_y)$ x: $C_{x1}, C_{x2}, R_x, C_{x3}, C_{x4}$ y: $C_{y1}, C_{y2}, R_y, C_{y3}, C_{y4}$

Here, θ denotes the threshold, $H(R_x, R_y)$ denotes a hash value of the coordinates of the gallery g. As described above, the hash value may be obtained by adding a value to the coordinates of the g so that the hash value of the g cannot be easily construed. According to another embodiment of the present invention, the center point value may be used as the coordinate value associated with the real region.

The hash value is calculated by using a hash function. As a representative hash function, MD5 may be used. However, the present invention is not limited to a specific hash function.

The threshold θ is calculated by the analysis of the genuine comparison values distribution and the impostor comparison values distribution as described above. The threshold may be different according to classes and systems. However, a single value is used in the same system.

However, the threshold θ may not be included according to an object of the present invention. Specifically, a secure template can be generated by using only the hash value of the center point without the threshold, and in this case, secure data storage and recognition is possible.

The real region is represented as $R_x$ and $R_y$, and remaining chaff regions are represented as $C_{x1}$ and $C_{y1}$, and the like. According to the current embodiment, four chaff regions are allocated to each of the x and y axes. However, the number of the chaff regions can be increased or decreased by the user as described above. In addition, as in the current embodiment, the same number of chaff regions can be allocated to each axis. In addition, different numbers of chaff regions can be allocated to the axes.

Finding the feature vector of the user corresponding to the galley g illustrated in FIG. 6 by using the data structure having the form according to the aforementioned embodiment is computationally infeasible due to the complexity of the computations. According to the embodiment in which the region associated value is the hash value of the center value, in order to find an element of each axis of the gallery g, that is, an original feature vector or data from a proposed template, hash values are calculated by selecting and combining the center points of the real region and the chaff region stored for each axis, and the calculated hash values are compared with the hash value $H(R_x,R_y)$ of the center coordinates of the real region stored in the template.

According to the aforementioned embodiment, for the convenience of description, the four chaff regions are allocated to each axis in a two-dimensional space. However, for a general and practical circumstance, in a case where nine chaff regions are inserted to each dimension of a twenty-dimensional feature vector, $10^{20}$ region center point combinations can be generated, and only one of the $10^{20}$ region center point combinations is an accurate center point combination of the real region.

Specifically, since computation complexity for searching for original data is exponentially increased according to the number of data dimensions, finding a vector value of the original data from a template proposed for a high-dimensional feature vector is practically and computationally infeasible.

An embodiment of a template in which the numbers of chaff regions are different from each other according to axes and different numbers of chaff regions are allocated to both sides of the real region is represented as follows.

θ, $H(R_x,R_y)$ x: $C_{x1}$, $R_x$, $C_{x2}$, $C_{x3}$, $C_{x4}$, $C_5$ y: $C_{y1}$, $C_{y2}$, $R_y$, $C_{y3}$,

A data structure of a secure template according to the present invention may be generally represented as in FIG. 8. Data to be securely stored exists in an n-dimensional space. Here, since m chaff regions are allocated to each axis, the number of cases for finding the original information on the user, that is, the registration feature vector from the template is $(m+1)^n$.

As described above, the template data structure having a form without the threshold θ can be generated as a secure template structure that can achieve the object of the present invention. However, for the convenience of description, the embodiment including the threshold θ is described.

Figure 9:
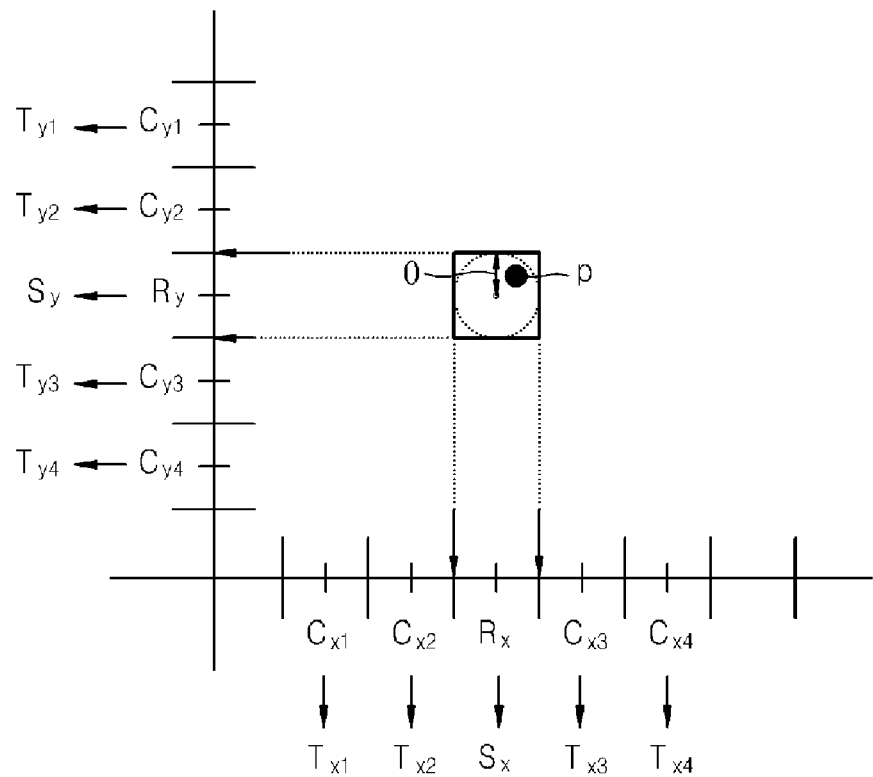
FIG. 9 is a diagram for explaining an authentication, recognition, and comparison principle and method according to an embodiment of the present invention and illustrating a case where a probe and a galley are classified into the same class.
Figure 10:
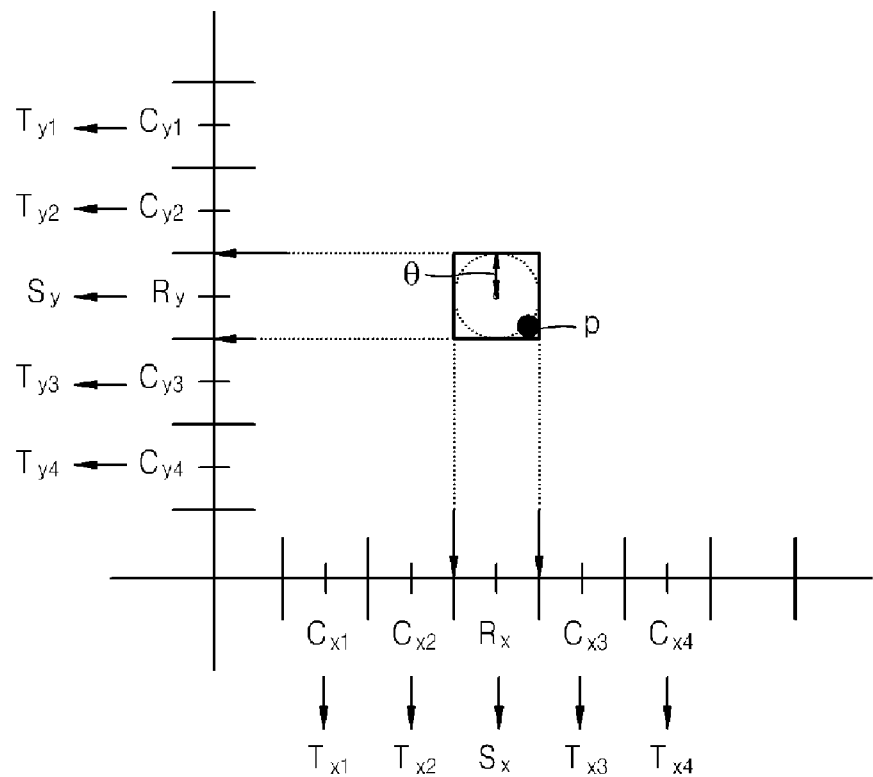
FIG. 10 is a diagram for explaining the authentication, recognition, and comparison principle and method according to an embodiment of the present invention and illustrating a case where a probe is classified into a different class from a gallery.

FIGS. 9 to 11 will now be described.

First, it is assumed that a gallery, that is, the registration template, is represented as follows.

θ, $H(R_x,R_y)$ x: $C_{x1}$, $C_{x2}$, $R_x$, $C_{x3}$, $C_{x4}$ y: $C_{y1}$, $C_{y2}$, $R_y$, $C_{y3}$, $C_{y4}$

An authentication, recognition, and comparison principle and method is described by using the gallery that is the registered template.

When a probe is inputted, a region of each axis corresponding to the input probe is determined by using a gallery that allegedly has the same class as the input probe. Next, by using associated values of the regions to which the probe belongs, it is determined whether or not the probe belongs to a decision boundary defined in the corresponding regions.

The associated values of the regions used as the center point of a corresponding region are described in detail as follows. First, FIG. 9 is a diagram for explaining the principle and the method of authentication, recognition, and comparison according to the present invention and illustrating a case where the probe and the galley are classified into the same class.

Here, p denotes the probe. The center points of each region and the corresponding region illustrated in FIG. 9 are re-configured by a content of the defined registration template.

The probe p illustrated in FIG. 9 belongs to a region having the center point of $(R_x, R_y)$. Next, a hash value of an associated coordinate value of the region to which the probe p belongs and a distance between the center point coordinate of the region to which the probe p belongs and the probe p is obtained. In this case, as described above, the associated value of the region to which the probe p belongs is used as the center point coordinates of the corresponding region.

It is determined whether or not a hash value of the associated coordinate value of the region to which the probe p belongs is the same as the hash value $H(R_x, R_y)$ stored in the registration template. In addition, it is determined whether or not a distance between the center point coordinate of the region to which the probe p belongs and the probe p is shorter than the threshold θ. When the hash values are the same and the distance is shorter than the threshold θ, the probe p is recognized to be in the same class (and is referred to as genuine) as the gallery. The p in FIG. 9 satisfies the two conditions, so that the probe p is recognized to be in the same class as the corresponding gallery.

The aforementioned case means that the probe p and the gallery g are classified into the same class (the probe is referred to as genuine) in the existing genuine/impostor pattern recognition method according to the decision equivalence principle. In other words, when it is assumed that the probe p and the gallery g are biometric information on the user, the aforementioned case means that the user is recognized as genuine by an existing biometric methodology or system. Specifically, when the user is recognized as genuine by the existing biometric methodology or the system, the corresponding user can be recognized as the genuine by the user authentication method using the secure template structure proposed according to the present invention.

According to another embodiment, the genuine or the impostor can be identified by comparing only the hash values. However, in order to maintain the decision results to be the same as those in the existing genuine/impostor pattern recognition method according to the aforementioned decision equivalence principle, the distance values in addition to the hash values may be used for the comparison.

FIG. 10 illustrates a case where the probe is classified into a different class from the gallery unlike in FIG. 9.

According to an embodiment illustrated in FIG. 10, the probe p illustrated in FIG. 10 is inside a square having the center point $(R_x, R_y)$, and a hash value of the center point is the same as the hash value $H(R_x, R_y)$ of a center point combination of the real region of the registered template. However, a distance between the probe p and the center point coordinate $(R_x, R_y)$ of the region to which the probe p belongs is longer than the threshold θ, so that the probe p is classified into a different class (the probe is referred to as impostor) from the gallery g.

The aforementioned case means that the probe p is classified into the different class (the probe p is referred to as impostor) from the gallery g in the existing genuine/impostor pattern recognition method according to the decision equivalence principle described above. In other words, when it is assumed that the probe p and the gallery g are biometric information on the user, the aforementioned case means that the user is recognized as the impostor by the existing biometric methodology or the system. Specifically, when the user is recognized as the impostor by the existing biometric methodology or the system, the user cannot be recognized as genuine by the user authentication method using the secure template structure proposed according to the present invention.

Figure 11A:
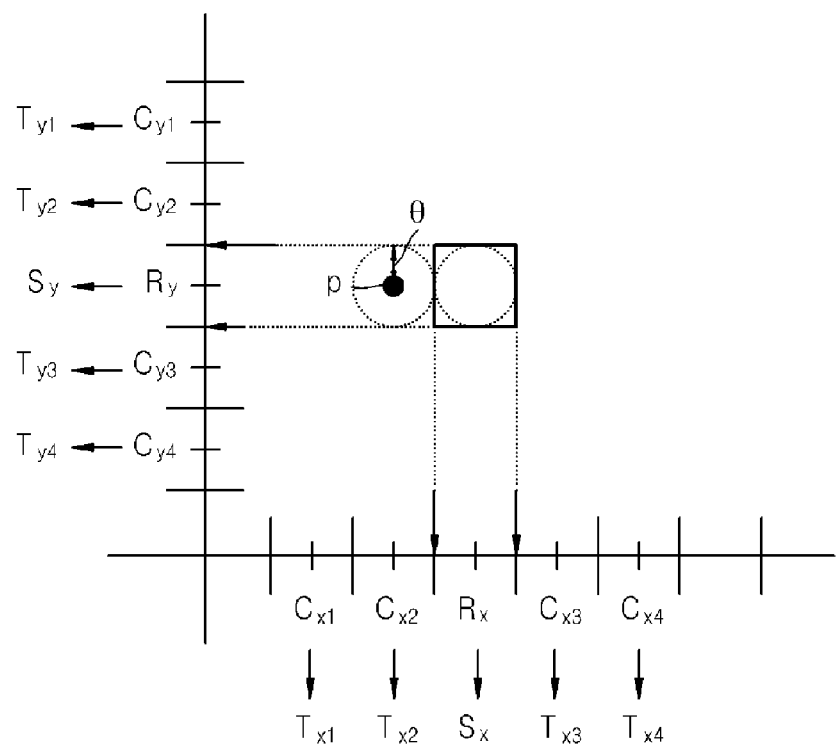
FIGS. 11A and 11B are diagrams for explaining the authentication, recognition, and comparison principle and method according an embodiment of to the present invention and illustrating a case where a probe is classified into a different class from a gallery.
Figure 11B:
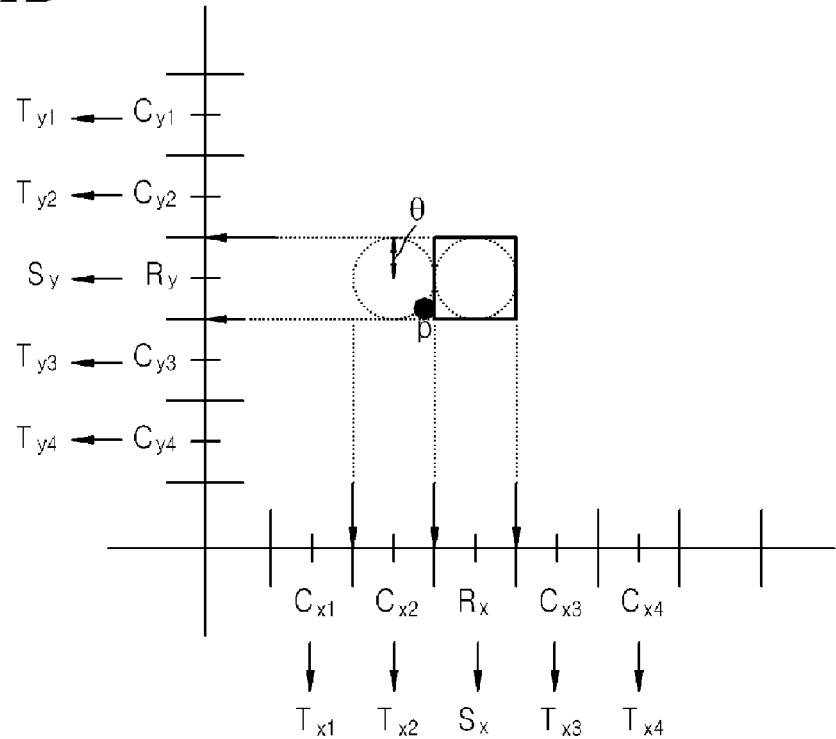

FIGS. 11A and 11B illustrate other examples of classifying the probe p into a different class from the gallery g.

Referring to FIG. 11A, a distance between the probe p and the center point coordinate of a region to which the probe p belongs is shorter than the threshold θ. However, a hash value of the center point coordinate of the region to which the probe p belongs and the hash value $H(R_x, R_y)$ stored in the registered template are different from each other, so that the probe p is classified into a different class (the probe is referred to as impostor) from the gallery g.

Specifically, in order for a probe p to be classified into the same class (the probe is referred to as genuine) as the gallery g, the probe p has to belong to the real region among regions defined for the corresponding gallery g, and a distance between the probe p and the center point of the region to which the probe p belongs has to be shorter than the threshold θ. This shows the same result as the existing pattern recognition decision method of determining the probe as genuine or impostor by obtaining comparison values of two templates and using a threshold calculated in advance, according to the 'decision equivalence principle'.

FIG. 11B illustrates another example of classifying the probe p into a different class from the gallery g, that is, the probe is classified as impostor. Referring to FIG. 11B, a distance between a probe p and the center point coordinate of a region to which the probe p belongs is longer than the threshold θ, and a hash value of the center point coordinate of the region to which the probe p belongs and the hash value $H(R_x, R_y)$ stored in the registered template are different from each other.

Specifically, as described above with reference to FIGS. 9 to 11B, when the method proposed according to the present invention is applied, the same recognition result can be obtained as in the existing pattern recognition technique in a state where original data is securely stored.

Figures 12, 13:
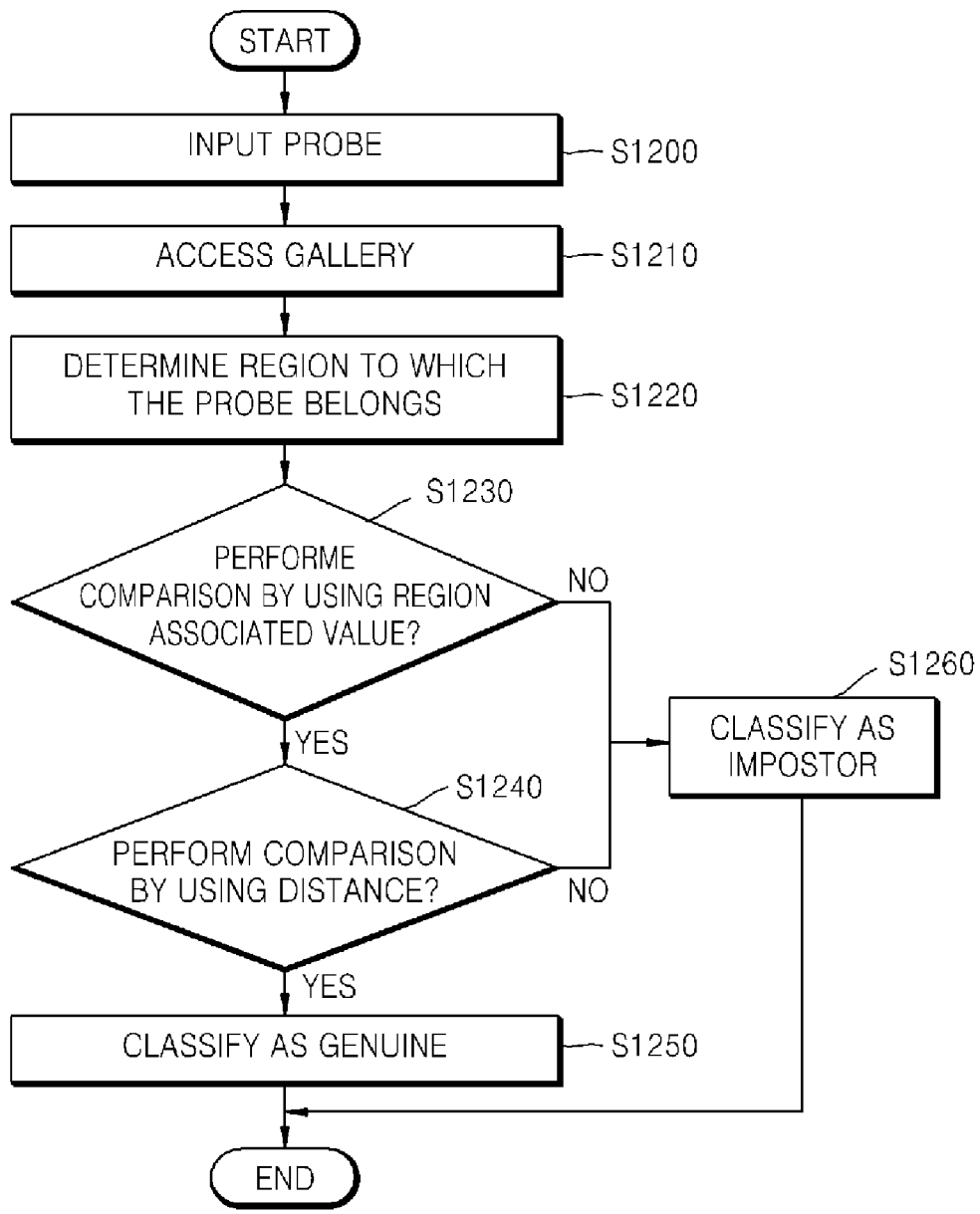
FIG. 12 is a flowchart of the authentication, recognition, and comparison method using the secure data storage structure according to an embodiment of the present invention.
FIG. 13 illustrates an example of a data structure for securely storing and managing secret information by using biometric information on a user according to an embodiment of the present invention.

FIG. 12 is a flowchart of an authentication, recognition, and comparison method using the secure data storage structure proposed according to an embodiment of the present invention.

First, data to be compared is input, and a probe is generated by converting the data into a template for pattern recognition (operation S1200). In order to determine whether or not the probe and a template registered and stored in advance and are classified into the same class, a gallery, that is, the template registered and stored in advance, is accessed (operation S1210).

Next, a region to which the probe belongs is determined, and a region associated value of the region is obtained (operation S1220). The region associated value and coordinate of the probe are obtained. Accordingly, preparations of comparing the two templates are completed.

The region associated value and the coordinate of the probe are compared (operation S1230) to determine whether or not the coordinates of the probe are inside a genuine decision boundary configured with thresholds.

According to an embodiment, when a hash value of the center point of the region is selected as the region associated value, the hash value of the center point of the region to which the probe belongs and the hash value stored in the gallery are compared with each other. When the hash values are different from each other, the probe is determined as the impostor (operation S1260). When the hash values are equal, it is determined whether or not the coordinate of the probe is inside the genuine decision boundary defined in the corresponding region on the basis of the center point coordinate (operation S1240). This means the aforementioned case where the genuine boundary is a circle or a sphere, a distance between the probe and the center point coordinate of a region to which the probe belongs are calculated, and it is determined whether or not the distance is shorter than a predetermined threshold. When the coordinates are inside the genuine decision boundary, the probe is classified into the same class as the gallery, that is, the probe is classified as genuine (operation S1250). As described above, this operation is alternatively performed, and the genuine and impostor classification can be performed by using only operation S1230 of comparing the hash value of the center point and the hash value stored in the gallery.

When a template having a threshold is used, operation S1240 may be additionally/alternatively performed.

As described above, when the present invention is applied to the biometric system, biometric information may be securely converted and stored, and user authentication can be performed in the state where the original biometric information is securely stored.

A method of securely storing/releasing secret information by using a variable value that is not a fixed value, such as biometric information is described. The method is applied with a similar principle to the genuine/impostor decision method using the secure data storage structure proposed in advance, and an omitted description can be understood by the aforementioned description.

FIG. 13 illustrates an example of a data structure for securely storing and managing secret information by using biometric information on the user according to an embodiment of the present invention. The center point of a chaff region in a form such as the aforementioned registration template is connected to a random value, and the center point of a real region is connected to a password to be securely protected. In FIG. 13, T denotes a random value, and S denotes a password to be securely protected.

Figures 14, 15:
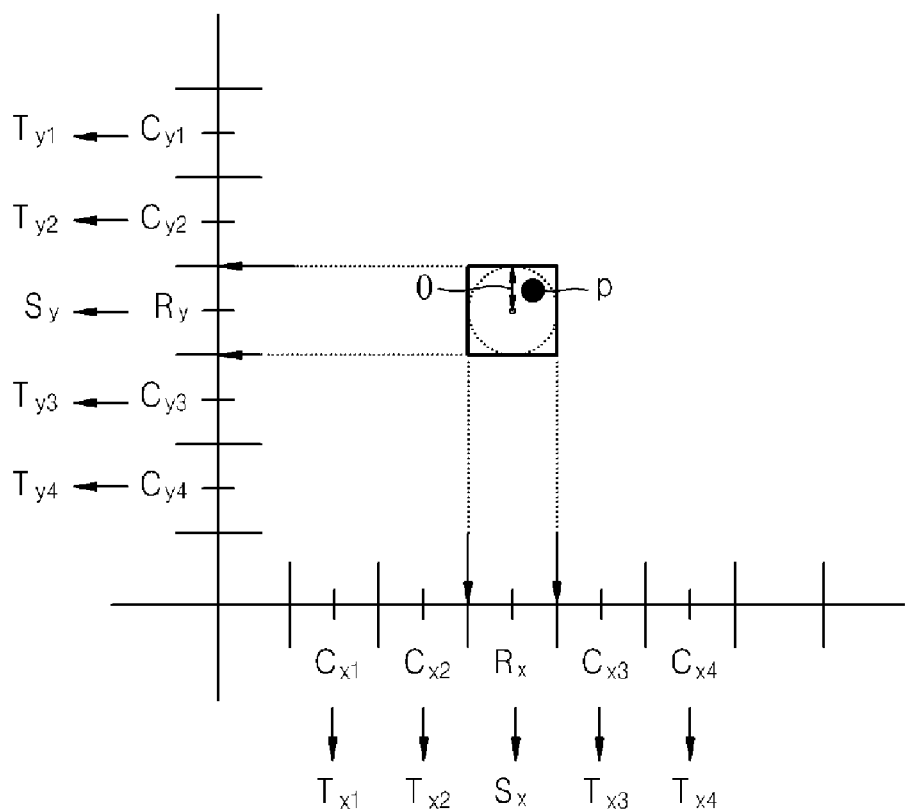
FIG. 14 illustrates a general example of the data structure for securely storing and managing the secret information by using the biometric information on the user according to an embodiment of the present invention.
FIG. 15 is a diagram for explaining the authentication, recognition, and comparison principle and method according to an embodiment of the present invention and illustrating a case where a probe is recognized as a genuine as a gallery.

FIG. 14 illustrates a general example of the data structure for securely storing and managing the secret information by using the biometric information on the user according to the present invention. In FIG. 14, an n-dimensional registration feature vector and m chaff regions are used.

It is assumed that the registration template, that is, the secret information on the user as illustrated in FIG. 13 or 14, is leaked. However, extracting bio-information and/or secret information on the user from the leaked registration template is impossible.

In order to release the secret information from the registered template having the aforementioned form, the user inputs unique information on the user such as biometric information on the user. Specifically, an iris scan is performed, or a fingerprint is printed. Next, the pattern recognition system generates a probe feature vector. Thereafter, the system determines a region to which the probe feature vector of the user belongs by using a region associated value such as the center point coordinates stored in the registered template having the form illustrated in FIG. 13 or 14. Next, it is determined whether or not the probe feature vector is inside a decision boundary defined in the corresponding region. This means the aforementioned case where when the decision boundary is a circle of a sphere, it is determined whether or not a distance between the center point coordinate of the corresponding region and the probe feature vector is shorter than the threshold θ. In a case where the probe feature vector is inside the decision boundary defined in the corresponding region or the decision boundary is the circle or the sphere, if the distance between the center point coordinates of the corresponding region and the probe feature vector is shorter than the threshold θ, a value connected to the center point coordinate of the region to which the probe feature vector belongs is returned to the user.

The aforementioned operations are described in detail with reference to FIGS. 15 to 17.

First, it is assumed that a data structure for securely storing and managing secret information or a gallery that is the registration template has the form as illustrated in FIG. 13.

The method of storing and releasing the secret information by using the gallery that is the registered template is described.

FIG. 15 is a diagram for explaining an authentication, recognition, and comparison principle and method according to an embodiment of the present invention and illustrating a case where a probe p is recognized as genuine as the gallery.

Center points of each region and a corresponding region illustrated in FIG. 15 are re-configured by the content of registration template defined in FIG. 13. The coordinate $(R_x, R_y)$ of the real region is connected to secret information $S(S_x, S_y)$, and remaining chaff regions are connected to arbitrary values T.

When a probe p is input, a region of each dimensional axis corresponding to the input probe p is determined by using a gallery that allegedly has the same class as the input probe p. Next, by using an associated values of the region to which the probe p belongs, it is determined whether or not the probe p belongs to a decision boundary defined in the corresponding region.

The probe p illustrated in FIG. 15 belongs to a region having the center point $(R_x, R_y)$. Next, a distance between the center point coordinate of the region to which the probe p belongs and the probe p is obtained. Of course, as described above, an associated coordinate value of the region to which the probe p belongs may be used as the center point value.

According to the current embodiment, the distance between the center point of the corresponding region and the probe p is shorter than the threshold θ. Therefore, the probe p is inside the real region defined by the gallery g and inside the decision boundary defined in the corresponding region. In FIG. 15, the system returns the secret information $S(S_x, S_y)$ for the probe p.

The aforementioned case means that the user is recognized as genuine by the existing biometric methodology or the system according to the decision equivalence principle. When the user is recognized as genuine by the existing biometric methodology and the system, the present system releases accurate secret information.

Figure 16:
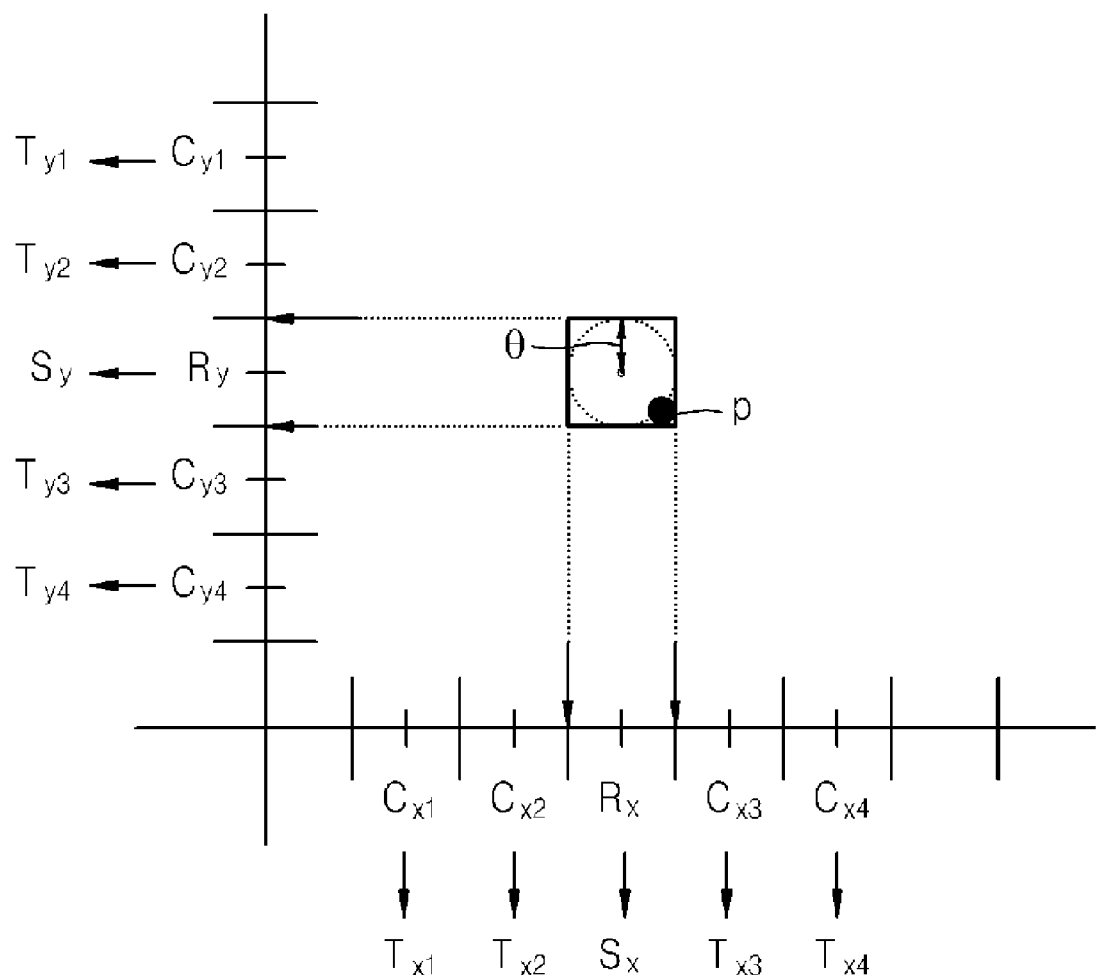
FIG. 16 illustrates a case where a probe is classified into a different class from a gallery, that is, as the impostor unlike in FIG. 15 and wrong secret information is released.

FIG. 16 illustrates a case where a probe p is classified into a different class from the gallery, that is, the probe is classified as impostor unlike in FIG. 15, and wrong secret information is released.

According to the embodiment illustrated in FIG. 16, a probe p belongs to a rectangular that is a region having the center point $(R_x, R_y)$ like the probe p illustrated in FIG. 15. However, a distance between the probe p and the center point coordinate $(R_x, R_y)$ of the region to which the probe p belongs is longer than the threshold θ, so that the probe p is not inside a decision boundary defined in the corresponding region to which the probe p belongs. Here, the system returns an arbitrary value or a value corresponding to null.

The aforementioned case means that the user is recognized as impostor by the existing biometric methodology or the system according to the decision equivalence principle. Specifically, when the user is recognized as impostor by the existing biometric methodology or the system, the present system cannot release accurate secret information.

Figure 17A:
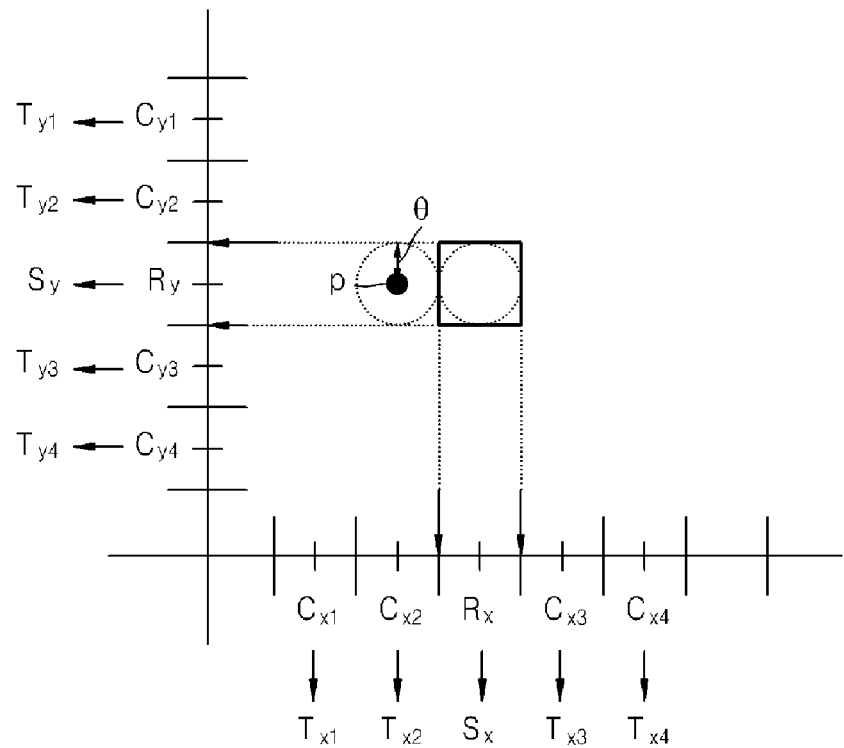
FIGS. 17A and 17B illustrate examples in which a user receives wrong secret information by inputting a probe that is classified as an impostor by the existing genuine/impostor pattern recognition method.
Figure 17B:
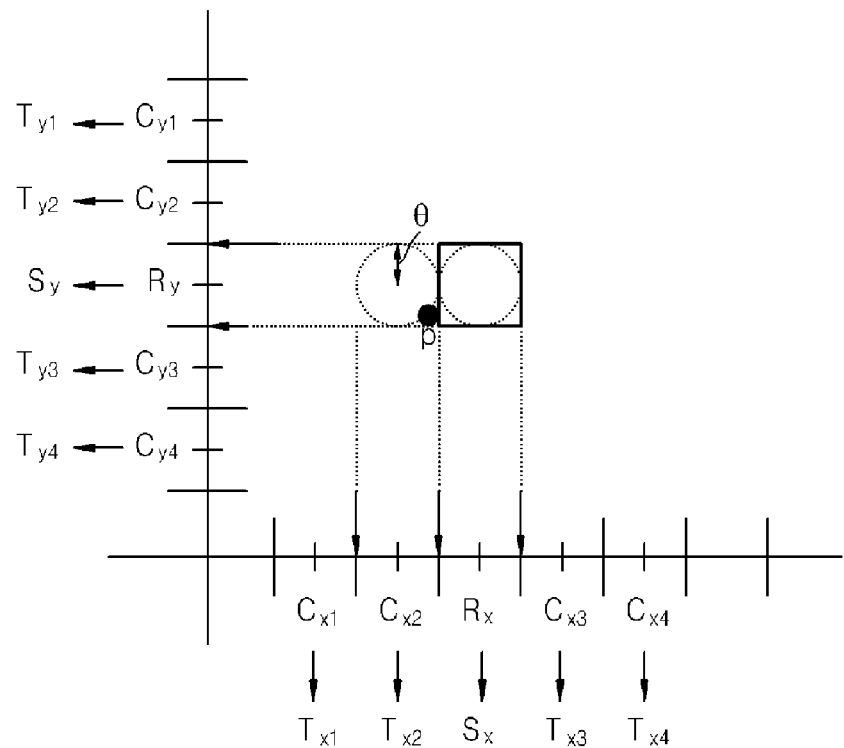

FIGS. 17A and 17B illustrate examples in which a probe p that is classified as impostor by the existing genuine/impostor pattern recognition method is inputted and the user receives wrong secret information.

A distance between the probe p illustrated in FIG. 17A and the center point coordinate of a region to which the probe p belongs is shorter than the threshold θ, and the probe p is inside a decision boundary defined in the region to which the probe p belongs. However, an x-component of the probe p belongs to a chaff region. Therefore, in this case, the system transfers $(T_{x2}, S_y)$ instead of original secret information $S(S_x, S_y)$, that is, releases wrong secret information.

FIG. 17B illustrates an example in which wrong secret information is released. In the example of FIG. 17B, a distance between a probe p and the center point coordinate of a region to which the probe p belongs is longer than the threshold θ, so that the probe p is not inside a decision boundary defined in the region to which the probe p belongs, and an x-component of the probe p belongs to a chaff region. Therefore, in this case, the user cannot receive accurate secret information. Here, the system returns an arbitrary value or null to the user.

Figure 18:
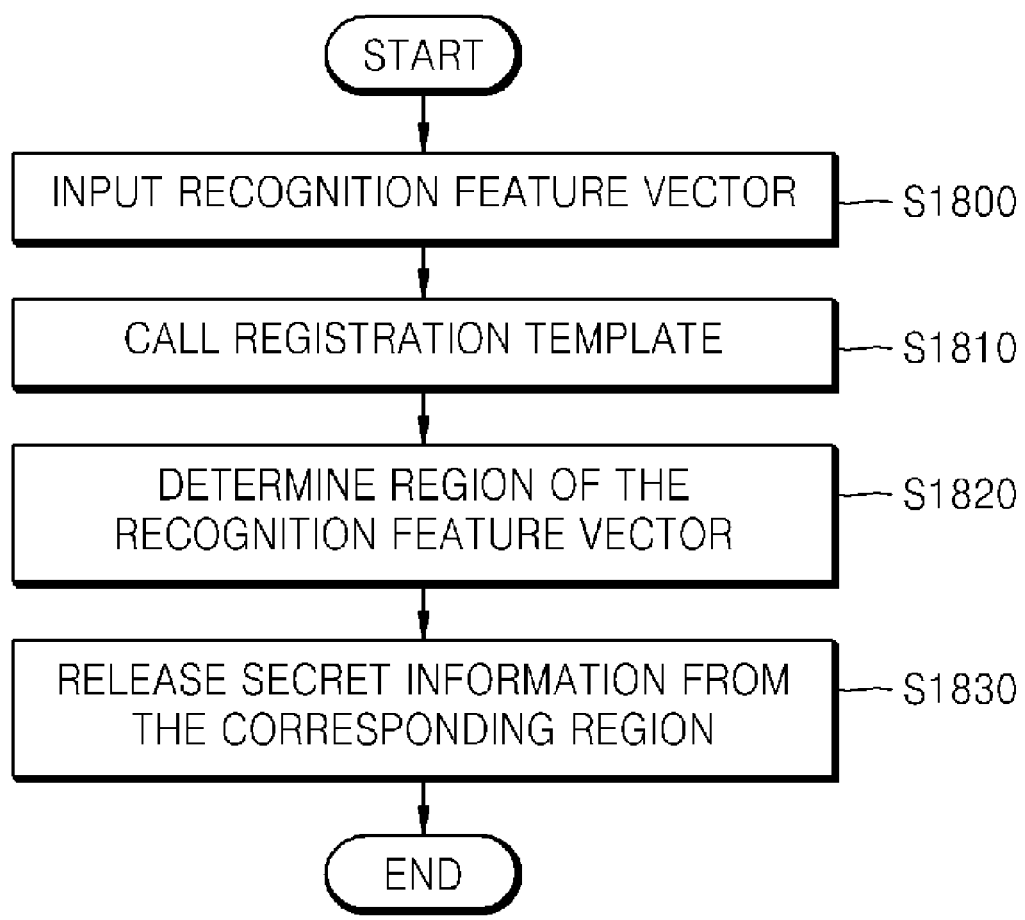
FIG. 18 is a flowchart of a method of releasing secret information, which is securely stored by using biometric information on the user, by using the biometric information on the user.

FIG. 18 is a flowchart of a method of releasing secret information that is securely stored by using biometric information on the user, by using the biometric information on the user.

Similarly to in the aforementioned example, a recognition feature vector is input (operation S1800). A registration template is called for comparison (operation S1810). When a region of the recognition feature vector is determined (operation S1820), in a case where the recognition feature vector is determined as the registration template by comparison, the user can release desired secret information such as a password from the corresponding region (operation S1830).

When the principle according to the present invention is applied to the biometric system, a personal password or a private key that is secret information can be extracted from a registration template only in the same condition as in which the user is authenticated as the genuine by the existing biometric system or the biometric methodology, according to the 'decision equivalence principle'.

Figure 19A:
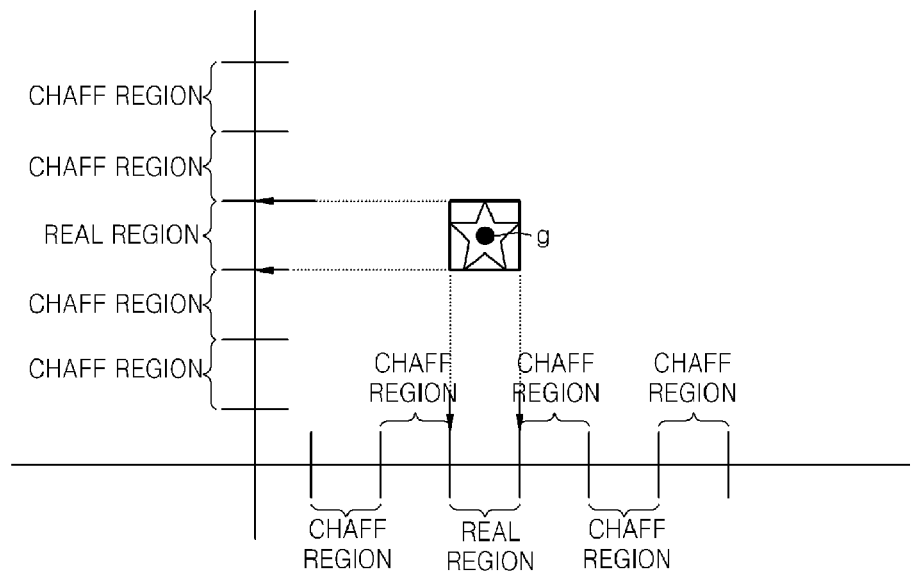
FIG. 19A is a diagram for applying the principle according to the present invention to a comparison, authentication, and recognition method using a decision boundary having a shape of a star according to an embodiment of the present invention.

FIG. 19A is a diagram for applying the principle according to the present invention to a comparison, authentication, and recognition method using a decision boundary having a shape of a star according to an embodiment of the present invention.

According to the aforementioned embodiments, in order to maintain the equivalence with the threshold-based genuine/impostor decision method, the circle having the radius θ is used as the decision boundary. However, by applying the principle according to the present invention to the comparison/authentication/recognition method using a decision boundary having another shape instead of the circle, the same comparison/authentication/recognition result as the existing recognition method in a state where original data is securely stored can be obtained.

For example, when the decision boundary used in an arbitrary recognition system has a shape of a star as illustrated in FIG. 19A, similarly to in the aforementioned embodiments, a real region having the decision boundary and chaff regions are obtained for each dimensional axis. Next, coordinates for determining the shape of the decision boundary are stored. Here, so as not to release information on a gallery feature vector from the coordinates of the decision boundary, coordinates relative to the gallery feature vector g or coordinates relative to the center point of a region are stored instead of absolute coordinates of the decision boundary. In addition, as a region associated value, a hash value of the center point coordinate of a region to which a probe vector belongs is stored in the template. When comparison/authentication is performed, as described above, a hash value of the center point coordinate of the region to which the probe vector belongs and a hash value stored in the template are compared with each other. In addition, by using the center point coordinate of the corresponding region as a basis, whether or not the probe vector is inside the decision boundary is determined.

When the decision boundary is a circle, in the aforementioned two operations, the threshold θ is stored as relative coordinates of the decision boundary, and whether a distance between the center point coordinate of the region to which the probe feature vector p belongs and the probe feature vector p is shorter or larger than the threshold θ is determined.

Figure 19B:
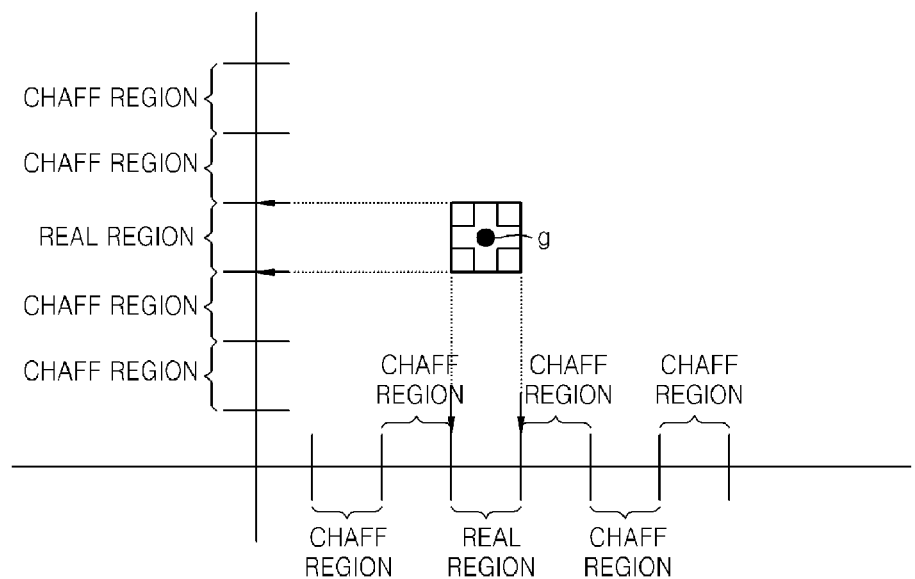
FIG. 19B is a diagram for applying the principle according to the present invention to the comparison, authentication, and recognition method using a decision boundary having a shape of a cross according to an embodiment of the present invention.

FIG. 19B is a diagram for applying the principle according to the present invention to the comparison, authentication, and recognition method using a decision boundary having a shape of a cross according to an embodiment of the present invention. As described above, the decision boundary may have a shape set by the user. Of course, the shape may be a polygonal shape. In addition, a region associated value may be a vertex of the polygon or a hash value of a vertex of the polygon.

Figures 20, 21:
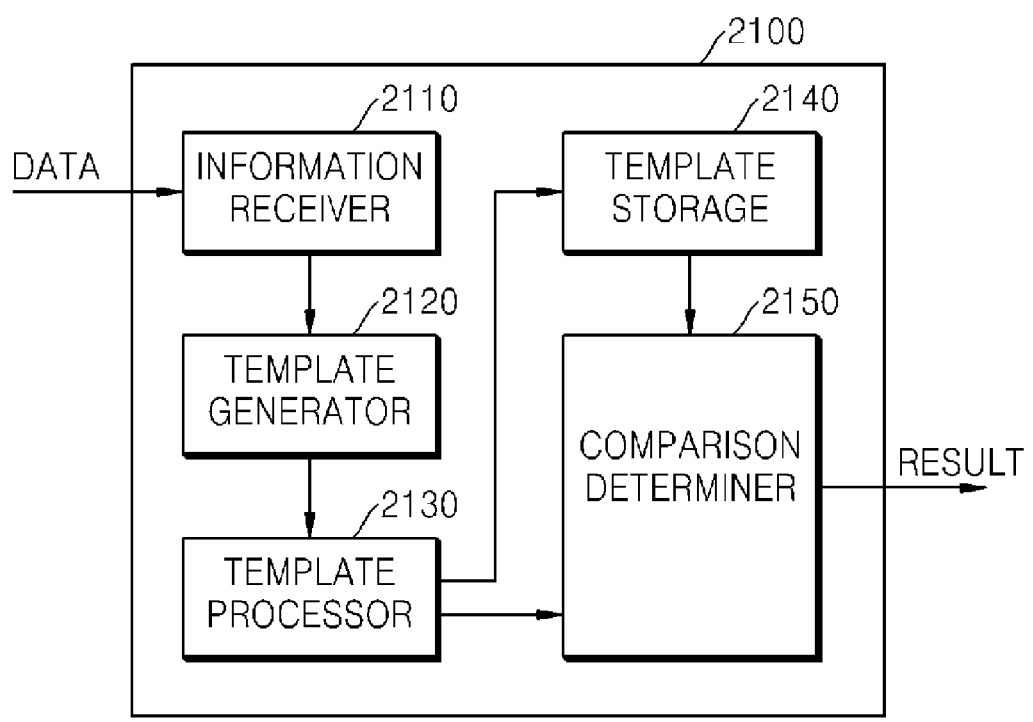
FIG. 20 illustrates an example of applying the data storage structure proposed according to an embodiment of the present invention to a two-dimensional feature vector in the recognition method using a decision boundary having a general form.
FIG. 21 is a block diagram illustrating a pattern recognition apparatus according to an embodiment of the present invention.

FIG. 20 illustrates an example of applying the data storage structure proposed according to the present invention to a two-dimensional feature vector in the recognition method using a decision boundary having a general form.

The data structure illustrated in FIG. 20 is an example of the template generated as illustrated in FIGS. 19A and 19B.

As described above, as needed, a hash value of the center point coordinates of a real region may not be stored.

For the convenience of description, the two-dimensional feature vector is used. However, it will be understood by those of ordinary skill in the art that high-dimensional data can be applied.

A set of relative coordinates of the decision boundary is stored as the threshold in the template.

FIG. 21 is a block diagram illustrating a pattern recognition apparatus 2100 according to an embodiment of the present invention.

The pattern recognition apparatus 2100 according to the present invention includes an information receiver 2110, a template generator 2120, a template processor 2130, a template storage 2140, and a comparison determiner 2150.

The information receiver 2110 receives data for pattern recognition. The input data is converted into a template by the template generator 2120. The template processor 2130 determines a region of the template generated by the template generator 2120, obtains the center point of the region, and calculates a hash value of the center point. Here, the template processor 2130 further performs a function of generating a real region and chaff regions to generate a gallery.

The template referred to as gallery that is generated by inputting initial basis data and includes the coordinate point, the hash value, and the coordinates to be used as a basis of the pattern recognition is generated, and the generated gallery is stored in the template storage 2140.

When data to be compared is inputted to the information receiver 2110, the data is converted into a probe by the template generator 2120 so as to be used for the comparison. The template processor 2130 calculates a region of the probe, the center point of the region, and a hash value of the center point, thereby completing preparations for the comparison.

Next, the template storage 2140 accesses the gallery stored in advance, and the comparison determiner 2150 compares the gallery and the probe with each other and determines whether the probe is genuine or impostor.

As described above, the present invention provides a method of converting original data into a secure form so that the original data cannot be extracted or recovered when data are leaked from a system or a database. In addition, the present invention provides the pattern recognition method of comparing and recognizing data in a state where the original data is not restored.

The method of converting and recognizing data according to the present invention has the following advantages.

First, data can be converted into a secure form. Specifically, as the number of dimensions of data to be converted is increased linearly, computation complexity for finding original data from the converted data is exponentially increased. Therefore, acquiring the original data is impossible even if the converted data is leaked. As a result, the data are protected in the secure form.

Next, comparison, authentication, or recognition can be performed in a state where the original data is securely converted. Therefore, the original data does not need to be restored to perform the comparison, authentication, or recognition. Therefore, unlike a data protection method using an existing cryptography method, original data do not need to be decoded and original data leakage can be prevented.

In addition, although the converted data is used to perform the comparison, authentication, and recognition, the same recognition and authentication results and performances can be maintained as in a case where the original data of the converted data is used.

When the aforementioned method is applied to a biometric system, specific advantages can be obtained as follows.

First, biometric information on a user cannot be construed from a proposed template, so that privacy intrusion of the user can be avoided.

Second, unlike a method of encoding, storing, and managing biometric information, an operation of decoding the biometric information is not needed for a template comparison operation. Specifically, in a state where the biometric information on the user is securely stored, user authentication can be performed by directly comparing a gallery and a probe of the user.

Third, the present invention is not limited to a specific biometric method or a system, and can be applied to various biometric modalities without changing a unique method of an existing system.

Last, secret information such as a password and a passkey can be released while being concealed by using the biometric information on the user.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, a method of securely storing data and a classification/analysis/recognition method are described. In order to easily explain the principle according to the present invention, terms and concepts from biometrics are used. However, the method proposed according to the present invention is not limited to a biometric system and biometric data.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A secure pattern recognition method comprising:
    (a) receiving, by a pattern recognition apparatus, data and generating a probe by converting the received data into a template for pattern recognition;
    (b) accessing a gallery that is a template registered and stored in advance, wherein the gallery includes information on a real region and a chaff region, and a hash value of a real region associated value, wherein the real region includes a decision boundary that is set based on a registration feature vector in a feature space, wherein the chaff region excludes the decision boundary in the feature space;
    (c) determining a region to which the probe belongs in the feature space and obtaining a region associated value from the region and calculating a hash value of the region associated value; and
    (d) determining whether or not the probe and the gallery are classified into the same class by deciding whether the probe is included in the decision boundary of the real region based on a comparison result between hash values of the region associated value and the real region associated value.

2. The method of claim 1, wherein the region associated value is a value set by a user to correspond to the region in advance and one of secret information, a password, a private key, and an arbitrary value designated by the user.

3. The method of claim 2, wherein, when the region associated value is the password, comparing in (d) includes comparing the password with a password stored by the user in advance.

4. The method of claim 2, wherein, when the region associated value is the private key, comparing in (d) includes comparing the private key with a secret key stored by the user in advance.

5. The method of claim 2, wherein, when the region associated value is the arbitrary value designated by the user, comparing in (d) includes comparing the arbitrary value designated by the user with the arbitrary value stored by the user in advance.

6. The method of claim 1, wherein the region associated value is a value obtained by converting a value set by the user to correspond to the region in advance and one of a hash value of secret information, a hash value of a password, a hash value of a private key, and a hash value of an arbitrary value designated by the user.

7. The method of claim 6, wherein, when the region associated value is the hash value of the password, comparing in (d) includes comparing the hash value of the password with a hash value of a password stored by the user in advance.

8. The method of claim 6, wherein, when the region associated value is the hash value of the private key, comparing in (d) includes comparing the hash value of the private key with a hash value of a secret key stored by the user in advance.

9. The method of claim 6, wherein, when the region associated value is the hash value of the arbitrary value designated by the user, comparing in (d) includes comparing the hash value of the arbitrary value designated by the user with a hash value of an arbitrary value stored by the user in advance.

10. The method of claim 1, wherein the region associated value is the center point of the region.

11. The method of claim 10, wherein comparing in (d) includes calculating a distance between the probe and the center point.

12. The method of claim 10, wherein comparing in (d) includes calculating similarity between the probe and the center point.

13. The method of claim 1, wherein the region associated value is one of vertices of a polygon when the region has a polygonal shape.

14. The method of claim 13, wherein comparing in (d) includes calculating a distance between the probe and the vertex.

15. The method of claim 13, wherein comparing in (d) includes calculating similarity between the probe and the vertex.

16. The method of claim 1, wherein the region associated value is a hash value of the center point of the region.

17. The method of claim 16, wherein comparing in (d) includes comparing a hash value of the probe with the hash value of the center point.

18. The method of claim 1, wherein the region associated value is a hash value of one of vertices of a polygon when the region has a shape of the polygon.

19. The method of claim 18, wherein comparing in (d) includes comparing a hash value of the probe with the hash value of the one of the vertices.

20. The method of claim 1, wherein, when it is determined that the probe and the gallery are classified into the same class, a value connected to the region is returned to the user.

21. A template generation method for secure pattern recognition, comprising:
(a) inputting a registration feature vector;
(b) generating, by a pattern recognition apparatus, a real region using the registration feature vector;
(c) generating a predetermined number of chaff regions at regions excluding the real region; and
(d) storing a registration template including information on the real region and the chaff regions, and a hash value of a real region associated value, wherein the real region includes a decision boundary that is set based on the registration feature vector in a feature space, wherein the chaff regions exclude the decision boundary in the feature space.

22. The method of claim 21, wherein in (d), the stored registration template further includes a hash value of the center point of the real region as a value associated with the real region.

23. The method of claim 22, wherein a hash value is calculated by adding an arbitrary value to the center point of the real region.

24. The method of claim 21, wherein in (d), the stored registration template further includes a hash value of one of vertices of the real region as a value associated with the real region.

25. The method of claim 24, wherein a hash value is calculated by adding an arbitrary value to the one of the vertices of the real region.

26. The method of claim 21, wherein in (d), the stored registration template includes a random value connected to the chaff region and secret information to be securely protected connected to the real region.

27. The method of claim 26, wherein the secret information is a password.

28. The method of claim 26, wherein the secret information is a private key.

29. The method of claim 26, wherein the secret information is an arbitrary value set by the user.

30. The method of claim 26, wherein the secret information is a hash value of a password.

31. The method of claim 26, wherein the secret information is a hash value of a private key.

32. The method of claim 26, wherein the secret information is a hash value of an arbitrary value set by the user.

33. The method of claim 21, wherein (d) storing a registration template further includes a threshold used to configure a decision boundary.

34. The method of claim 33, wherein the decision boundary configured with the threshold is a circle having a radius equal to the distance from the center of the real region to the threshold.

35. The method of claim 33, wherein the decision boundary configured with the threshold is a set of coordinate values designated by the user.

36. The method of claim 35, wherein the set of the coordinate values is coordinate values relative to the center coordinates of the real region.

37. The method of claim 33, wherein the decision boundary configured with the threshold has a polygonal shape.

38. The method of claim 37, wherein the threshold is a set of coordinate values for configuring the decision boundary.

39. The method of claim 38, wherein the set of the coordinate values has coordinate values relative to the center coordinate of the real region.

40. The method of claim 21, wherein the coordinates of the real region and the chaff regions are coordinates in a two or more dimensional space, and the numbers of generated chaff regions allocated to axes of the dimensions are equal.

41. The method of claim 40, wherein the numbers of the chaff regions on both sides of the real region are equal.

42. The method of claim 40, wherein the numbers of the chaff regions on both sides of the real region are not equal.

43. The method of claim 21, wherein coordinates of the real region and the chaff regions are coordinates of a two or more dimensional space, and the numbers of the generated chaff regions allocated to axes of the dimensions are different from each other.

44. The method of claim 43, wherein the numbers of the chaff regions on both sides of the real region are equal.

45. The method of claim 43, wherein the numbers of the chaff regions on both sides of the real region are not equal.

46. A secure pattern recognition apparatus comprising:
an information receiver receiving data;
a template generator generating a template from the data received by the information receiver;
a template processor determining a region of the template generated by the template generator in a feature space, obtaining a region associated value, and calculating a hash value of the region associated value and coordinates of the template;
a template storage storing a gallery generated in advance, wherein the gallery includes information on a real region and a chaff region, and a hash value of a real region associated value, wherein the real region includes a decision boundary that is set based on a registration feature vector in a feature space, wherein the chaff region excludes the decision boundary in the feature space; and
a comparison determiner calling the gallery from the template storage and deciding whether the probe is included in the decision boundary of the real region based on the coordinates of the template, hash values of the region associated value and the real region associated value, and determining whether or not the template and the gallery are classified into a same class.

47. The method of claim 46, wherein the template processor generates the real region and the chaff regions from the registration feature vector to generate the gallery.

* * * * *